US008819487B2

(12) United States Patent
Lee et al.

(10) Patent No.: US 8,819,487 B2
(45) Date of Patent: Aug. 26, 2014

(54) SYSTEM RESET

(71) Applicant: Microsoft Corporation, Redmond, WA (US)

(72) Inventors: Desmond T. Lee, Redmond, WA (US); Vinit Ogale, Bellevue, WA (US); Keshava Prasad Subramanya, Bellevue, WA (US); Sri Sai Kameswara Pavan Kumar Kasturi, Bellevue, WA (US); Hongliu Zheng, Sammamish, WA (US); Yunan Yuan, San Francisco, CA (US); Gregory W. Nichols, Bellevue, WA (US); Stephan Doll, Seattle, WA (US); Kiran Kumar Dowluru, Redmond, WA (US); Calin Negreanu, Lake Oswego, OR (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/931,948

(22) Filed: Jun. 30, 2013

(65) Prior Publication Data
US 2013/0290949 A1   Oct. 31, 2013

Related U.S. Application Data

(63) Continuation of application No. 12/967,838, filed on Dec. 14, 2010.

(51) Int. Cl.
*G06F 11/00* (2006.01)
(52) U.S. Cl.
USPC ............................ 714/15; 714/6.12; 714/38.1
(58) Field of Classification Search
None
See application file for complete search history.

(56) References Cited

U.S. PATENT DOCUMENTS

| 6,845,464 | B2 | 1/2005 | Gold |
| 6,948,099 | B1 | 9/2005 | Tallam |
| 7,729,690 | B1 | 6/2010 | Huang et al. |
| 2002/0042892 | A1 | 4/2002 | Gold |
| 2002/0053044 | A1 | 5/2002 | Gold et al. |
| 2004/0117414 | A1* | 6/2004 | Braun et al. .................. 707/204 |

(Continued)

FOREIGN PATENT DOCUMENTS

| CN | 1437111 A | 8/2003 |
| CN | 101641681 A | 2/2010 |
| JP | H05189075 A | 7/1993 |

OTHER PUBLICATIONS

Choosing the Best Scenario for Deploying Windows XP Professional; Published Jun. 1, 2004; http://technet.microsoft.com/en-us/library/bb457089.aspx; 13 pages.

(Continued)

*Primary Examiner* — Michael Maskulinski
(74) *Attorney, Agent, or Firm* — John Jardine; Andrew Sanders; Micky Minhas (57) ABSTRACT

Some embodiments of the invention provide techniques whereby a user may perform a system reset (e.g., to address system performance and/or reliability degradation, such as which may be caused by unused applications that unnecessarily consume system resources, an attempted un-install of an application that left remnants of the application behind, and/or other causes). In some embodiments, performing a system reset replaces a first instance of an operating system on the system with a new instance of the operating system, and removes any applications installed on the system, without disturbing the user's data.

20 Claims, 4 Drawing Sheets

(56) References Cited

U.S. PATENT DOCUMENTS

| | | |
|---|---|---|
| 2005/0144617 A1 | 6/2005 | Chefalas et al. |
| 2006/0041572 A1 | 2/2006 | Maruyama |
| 2006/0059327 A1 | 3/2006 | Brown et al. |
| 2006/0069902 A1 | 3/2006 | Rui et al. |
| 2009/0265702 A1 | 10/2009 | Lu et al. |

OTHER PUBLICATIONS

How to Reinstall Windows XP and Save User Documents and Settings—Published Jun. 8, 2010; http://www.ehow.com/how_6604348_reinstall-save-user-documents-settings.html; 7 pages.

Reinstall Windows Me; Published Oct. 2006; http://www.smartcomputing.com/editorial/article.asp?article=articles/archive/r1006/22r06/22r06.asp&guid=.

International Preliminary Report on Patentability issued Jun. 18, 2013 in PCT App. No. PCT/US2010/061181, including Written Opinion of the International Searching Authority; 5 pages.

International Search Report mailed Dec. 28, 2011 in PCT App. No. PCT/US2010/061181; 2 pages.

Chinese Office Action issued Jan. 16, 2014 in CN Pat. App. No. 2011104367105, including partial translation; 11 pages.

\* cited by examiner

SYSTEM RESET

CROSS-REFERENCE TO RELATED APPLICATION(S)

This application is a continuation of U.S. patent application Ser. No. 12/967,838, filed Dec. 14, 2010, now U.S. Pat. No. 8,639,973, issued Jan. 28, 2014, entitled "SYSTEM RESET". The entirety of this afore-mentioned application is incorporated herein by reference.

FIELD OF INVENTION

This invention relates to computer software, and more particularly to software used to reset the system to its original factory condition.

BACKGROUND

Some conventional operating systems provide users the capability to "roll back" or "restore" the operating system and/or applications executing on a computer to a state in which those components existed at a previous point in time. For example, "system restore" capability may allow a user to roll back system files, registry keys, installed applications, and/or other components to a state in which the components existed prior to a system malfunction or failure. Similarly, some operating systems provide the capability to perform a "system reset," whereby the operating system and/or applications are reset to their original, "factory" settings. Typically, a system reset involves performing a system restore to take the system back to the state in which it originally existed, prior to any changes being made to the operating system and/or applications, and/or prior to any user data being stored on the system. (The terms "system restore" and "system reset" are used herein to reference these capabilities for convenience, although any similarity between either of these terms and a term used to describe a capability provided by any conventional operating system should not be read to limit the term to the functionality provided by that operating system.)

SUMMARY

Applicant has appreciated that the performance and/or reliability of a computer system may degrade over time for any of numerous reasons. For example, the operating system and/or applications may begin to run more slowly, or "crash" more frequently, than previously observed. One reason for this may be applications that, despite being no longer employed by a user, continue to consume resources. Another reason may be that a user's attempt to un-install an application did not remove the application from the system completely. For example, a user experiencing problems with an application may try to un-install it, but doing so can leave the application in a "torn" state, or leave behind "wastes" that can detract from system performance. Yet another reason may be conflicts that arise between settings made by users, one or more applications and/or the operating system over time. For example, a user may have established a group of settings at a point in time, but then later installed an application which caused some or all of the settings to change in a way that puts them in conflict with other settings.

A user experiencing degraded system performance and/or reliability may attempt to perform a full system recovery, which typically involves the user backing up his/her personal data to an external storage device, reformatting the hard drive and then re-installing the operating system and any applications. There are a number of issues associated with users performing a full system recovery to deal with degraded system performance. First, it is a very time-consuming exercise. In addition, some users may not appreciate that their personal data must be backed up to an external storage device prior to starting a full system recovery, and may lose that data as a result when the hard drive is later reformatted. As a result, a user that was frustrated by an unsuccessful attempt to improve system performance by un-installing an application may end up doubly frustrated when their personal data is irretrievably lost as a consequence of performing a full system recovery.

An alternative approach commonly employed by users is to attempt to restore the system to a previous state in which it was running optimally, or reset it to original, factory conditions. However, there are a number of issues with each of these approaches as well. For example, a prerequisite to restoring the system to a previously backed up version is that a backup was performed. Performing a backup can be a time-consuming process, and (as noted above) often requires an external storage device, which can be misplaced and/or difficult to locate when needed. In addition, it can be very difficult for a user to identify when a system is running optimally, and to remember at that time that he/she needs to backup the system for later use. Even if the user believes that the system is running optimally at a specific time, and remembers to initiate a backup then, the user's belief may be misplaced, since the system may then include the root causes for later performance degradation, even if no symptoms have yet been exhibited. In addition, performing either a system restore or system reset, as with performing a full system recovery, involves the user backing up their personal data to an external drive, since conventional approaches can not guarantee that the user's data will not be deleted during the restore or reset operation.

Some embodiments of the invention address these and other deficiencies associated with conventional approaches by providing techniques whereby a user may address system performance and/or reliability degradation by performing a system reset to replace an existing instance of the operating system and/or applications with a new instance, without disturbing the user's personal data on the system. Any applications on the system that may be the cause of performance and/or reliability degradation may be removed completely. Before the existing instance of the operating system and applications are removed, the user's personal data may be set aside in a protected area on the hard disk and left undisturbed while removal occurs. When a new instance of the operating system is applied, the user may re-install any applications that he/she desires to have on the system. As such, some embodiments of the invention may provide a simple technique whereby users may address system performance and/or reliability degradation without disturbing their personal data and without having to perform time-consuming, complicated backup and/or restore operations.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Some embodiments of the invention provide techniques whereby a user may address system performance and/or reliability degradation (e.g., brought about by unused applications that unnecessarily consume system resources, an attempted un-install of an application that left remnants of the application behind, and/or other causes) by performing a system reset. In some embodiments, a system reset replaces a prior instance of an operating system on the system with a new instance, and removes applications installed on the system, without disturbing the user's data. Because the user's data is left undisturbed, embodiments of the invention may allow the user to address system performance and/or reliability degradation without having to endure the time-consuming process of backing up personal data to an external storage device needed to perform a full system recovery or system restore, or without having to guess when the system was running optimally so that a backup to which the system is to later be restored can be taken.

Some embodiments of the invention provide a process that includes several steps. First, the user's data and settings are identified and inventoried, and then moved to one or more protected locations in storage. Then, the existing instance of the operating system and any applications on the system are removed, while leaving the user's personal data and settings intact. A new instance of the operating system is then applied, and the user's settings, or a portion thereof, are then be applied to the new instance of the operating system. Thereafter, the user may re-install any applications which he/she desires. Because the previous instance of the operating system and any applications on the system are removed (e.g., in their entirety), the user may choose the applications that are re-installed, so that no trace of unwanted applications remain on the system to degrade its performance. Further, the entire procedure may be performed without having to temporarily migrate the user's personal data to an external storage device. This procedure is described in further detail below with reference to FIGS. 1-4.

Figure 1:
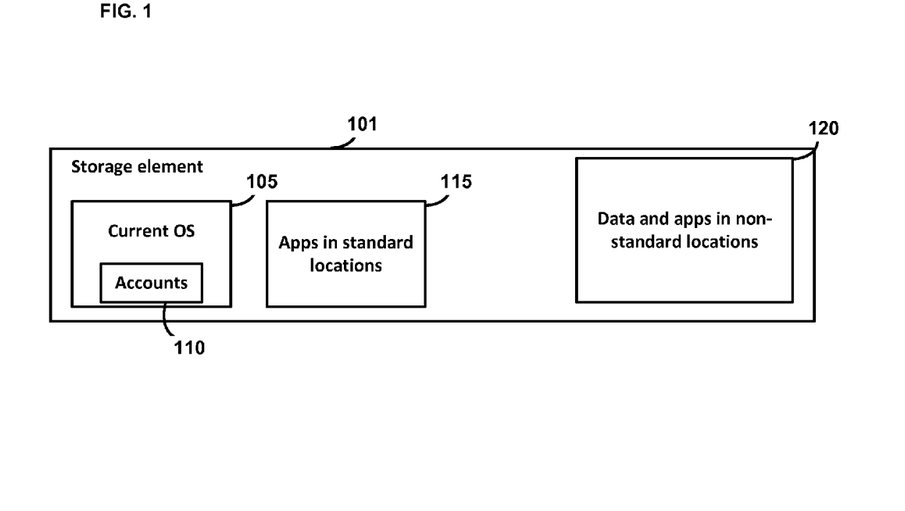
FIG. 1 is a block diagram depicting an example system configuration prior to performing a system reset, in accordance with some embodiments of the invention.

FIG. 1 is a high-level depiction of an example system prior to performing a system reset in accordance with some embodiments of the invention. In the example shown in FIG. 1, storage element 101 stores current operating system (OS) 105, reflecting any user accounts 110. The location of the information that constitutes current OS 105 on storage element 101 may be designated in any suitable manner. For example, in a Microsoft Windows-family operating system, offered by Microsoft Corporation of Redmond, Wash., the information comprising current OS 105 may be stored in the C:\Windows location. Other operating systems may designate one or more other locations, or not designate any location. Embodiments of the invention are not limited to being used with an operating system stored in any particular location.

Storage element 101 may comprise any suitable type of storage element, as embodiments of the invention are not limited in this respect. For example, storage element 101 may comprise a hard disk, flash drive and/or any other suitable type of physical storage medium(media). Storage element 101 need not comprise a physical storage element, however, and may alternatively comprise one or more virtual storage elements. For example, software element 101 may be implemented via one or more software constructs representing one or more physical storage elements. Further, although the example shown in FIG. 1 includes only a single storage element 101, not all embodiments of the invention are so limited, as any suitable number of storage elements may alternatively be employed. Embodiments of the invention are not limited to any particular manner of implementation.

In the example shown in FIG. 1, storage element 101 stores applications in "standard" locations 115. These applications may, for example, include applications that are installed at a file system location designated by the operating system for storing installed applications. For example, in a Microsoft Windows-family operating system, applications 115 may be stored in the C:\Program Files directory. Other operating systems may designate one or more other locations, or not designate any location for storing applications 115. Any suitable manner of designating applications that are to be removed from the system may be employed, as embodiments of the invention are not limited in this respect.

In the example of FIG. 1, storage element 101 also stores data and applications in "non-standard" locations 120. In some embodiments, data and applications 120 may represent any information stored on storage element 101 that is not encompassed by current OS 105 and applications 115. However, not all embodiments of the invention are so limited. Data and applications that are to be preserved may be designated in any suitable manner. For example, some embodiments may scan storage element 101 to identify storage locations that appear to store a user's personal data, accounts, applications and/or settings, look for storage locations (e.g., folders) that are known to be commonly used to store such information, or identify data and applications 120 in any other suitable manner.

Figure 2:
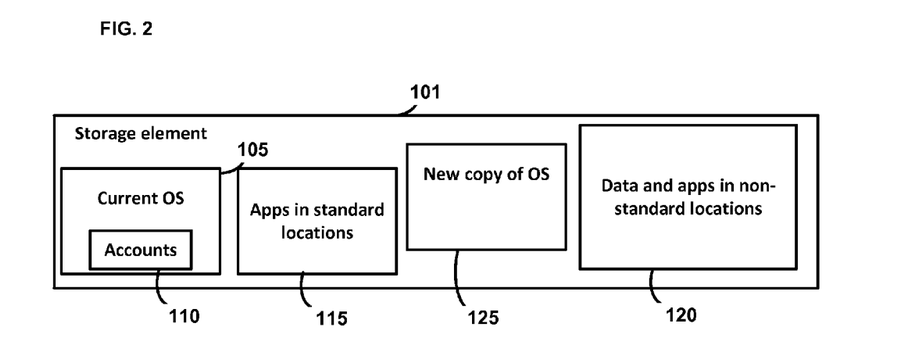
FIG. 2 is a block diagram depicting an example system configuration upon application of a new instance of an operating system, in accordance with some embodiments of the invention.

FIG. 2 depicts the example system shown in FIG. 1 after a new instance of the operating system 125 is applied to storage element 101. In some embodiments, new instance of operating system 125 is a "clean copy" of the OS in which all settings are placed in a default mode, and in which no applications that the operating system may otherwise provide are included. However, a new operating system instance may incorporate any suitable settings and/or applications, as embodiments of the invention are not limited in this respect.

Application of new instance of operating system 125 to storage element 101 may be performed in any of numerous ways. For example, some embodiments may involve transferring a "recovery image," which includes the body of data needed for a new installation of the operating system, from an external medium (e.g., a recording disk). Other embodiments may involve retrieving a recovery image from a recovery partition on storage element 101. In this respect, some computer and/or storage element manufacturers may load a recovery image on to a storage element, in a location that is separate from that in which the "live" instance of the operating system is stored, to facilitate a re-installation of the operating system if needed.

Still other embodiments may involve booting current OS 105 to an offline environment, which in some embodiments is an execution environment in which no operating system is executing, to create a recovery image that constitutes new instance of OS 125. The offline environment may, for example, include only components necessary to run specific targeted programs. When booted into the environment, execution of these programs by current operating system 105 may cause the recovery image to be generated. The recovery image may then be applied to storage element 101, as shown in FIG. 2.

New instance of OS 125 may be stored on storage element 101 in any suitable location. For example, in some embodiments, new instance of OS 125 may be stored in one more folders that are different from the folder(s) in which current OS 105 is stored. Embodiments of the invention are not limited to storing new instance of OS 125 in any particular location(s).

Figure 3:
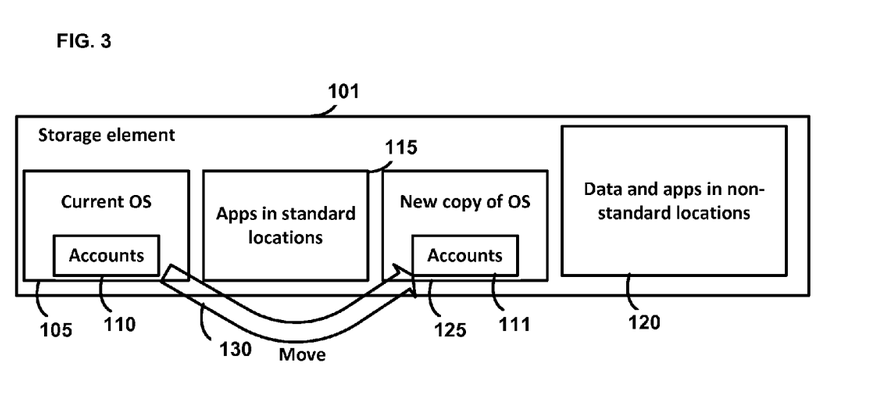
FIG. 3 is a block diagram depicting an example system configuration upon transferring user settings and accounts to the new instance of the operating system, in accordance with some embodiments of the invention.

As a result of applying new instance of OS 125 to storage element 101, two instances of the operating system now reside on storage element 101, with current OS 105 reflecting the user's settings, accounts, and other information. FIG. 3 depicts the example system being modified to apply these settings, accounts and other information to new instance of OS 125. Specifically, FIG. 3 indicates at 130 that the user's settings, accounts and other information are transferred from current OS 105 to new instance of OS 125. This may be performed in any of numerous ways. For example, in some embodiments, one or more hives of a registry maintained by current OS 105 are migrated to a registry maintained by new instance of OS 125.

Migrating user settings, accounts and other information to new instance of OS 125 may include performing any of numerous actions. In some embodiments, migration may include modification of settings, such as to head off future problems that are known to result from existing settings. For example, if it is known (e.g., based on a number of user calls to a help line) that a particular setting, or combination of settings, is problematic, then the setting(s) may not be applied to new instance of OS 125. For example, if it is known that users experience problems as a result of certain settings relating to wireless network configuration (which may result because users implemented the faulty settings, because applications changed the settings over time, and/or for other reasons), then those settings may not be migrated to new instance of OS 125. In some embodiments, a setting or combination of settings that is known to resolve the issue may instead be implemented. Embodiments of the invention may be implemented in any suitable manner.

Some user settings may not be migrated because a removal of one or more applications may make the settings obsolete. For example, a "program shortcut" on a user's desktop that refers to an application that is to be removed may not be transferred to new instance of OS 125. Any of numerous types of actions may be taken to ensure that any settings, accounts and/or other information transferred to new instance of OS 125 are valid and consistent with other information on the system.

In some embodiments, moving user accounts 111 may involve examining data and applications 120 to ensure that an account exists in new copy of OS 125 for any data files that specify a link to a user account. For example, if users A and B employ the system shown, and own files A.txt and B.txt, respectively, moving user accounts may involve examining files A.txt and B.txt to ensure that the accounts of users A and B are moved to new instance of OS 125. Of course, embodiments of the invention may ensure that data is accessible to any number of users (including one), in any suitable manner.

Figure 4:
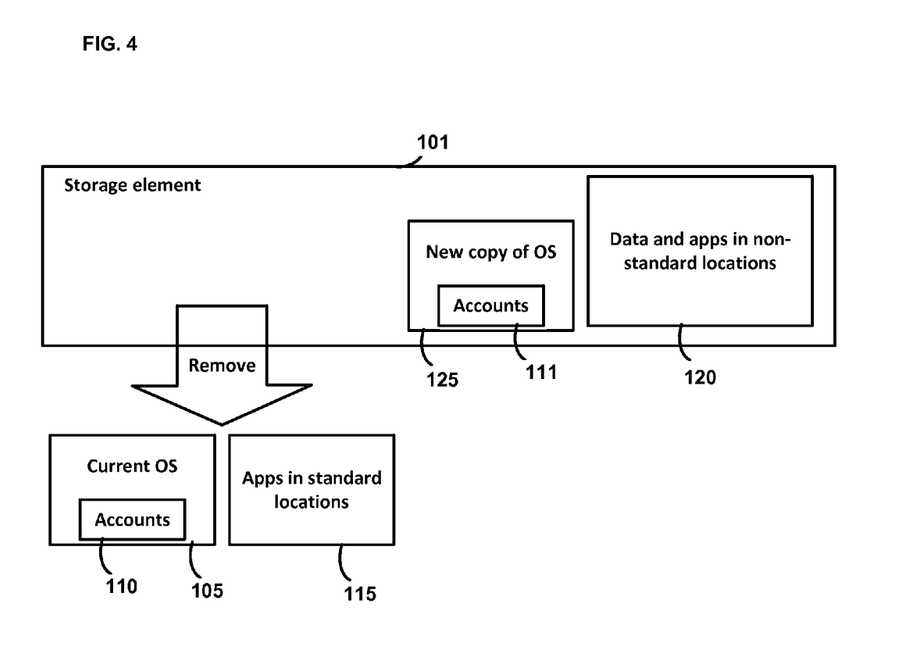
FIG. 4 is a block diagram depicting an example system configuration upon removal of a prior instance of an operating system and/or applications, in accordance with some embodiments of the invention.

FIG. 4 depicts the example system upon removal of current OS 105 and applications 115. Removal may be accomplished in any of numerous ways. For example, if the storage locations of the information comprising current OS 105 and applications 115 are known, then the information may be removed by performing one or more delete operations that specify the storage location(s). If all of the storage locations in which information comprising current OS 105 and applications 115 are not known, or cannot be determined with certainty, then all of the information not stored in the locations known to store new instance of OS 125 and data and applications 120 may be removed. Any of numerous techniques may be employed to remove current OS 105 and applications 115, as embodiments of the invention are not limited in this respect.

Figure 5:
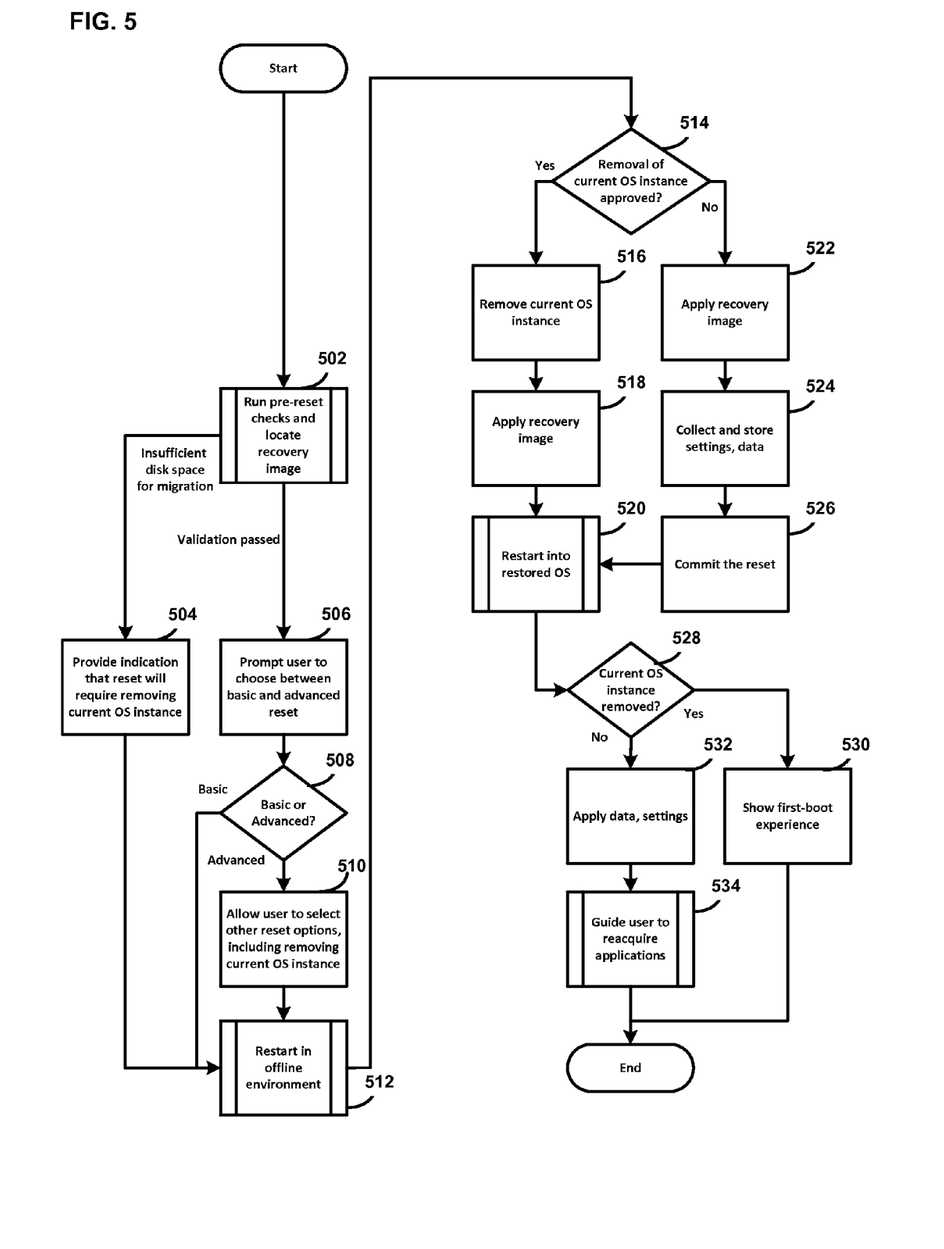
FIG. 5 is a flow chart depicting an example process for performing a system reset in accordance with some embodiments of the invention.

Some embodiments of the invention may provide for verifying that certain conditions are satisfied before a system reset occurs. For example, some embodiments may verify that storage element 101 includes sufficient storage space for new instance of OS 125 prior to commencing a system reset. If so, the new instance of OS 125 may be installed before the current OS 105 is removed from storage element 101. If not, a user may be provided the flexibility to first remove ("wipe") current OS 105 from storage element 101, and then apply new instance of OS 125 (e.g., in the same storage location(s) in which current OS 105 was stored prior to its removal). An example of this technique (i.e., example process 500) is shown in FIG. 5.

Example process 500 begins with act 502, in which one or more checks are performed prior to commencing a system reset. For example, a determination may be made whether the storage element includes sufficient storage space to store both a new instance of the operating system and the current instance of the operating system that is presently stored. In the example process 500, act 502 also includes locating a recovery image that will be used to instantiate the new instance of the operating system.

If it is determined as a result of the check(s) in act 502 that there is insufficient storage space to store both the new instance of the operating system and the current instance of the operating system on the storage element, then example process 500 proceeds to act 504, wherein an indication is provided to the user that proceeding with a reset will require removing the current instance of the operating system. In some embodiments, the result of removing the current instance of the operating system is that any user settings reflected in the current instance of the operating system will not be preserved, such that a "factory reset" is performed. However, not all embodiments of the invention are limited to such an implementation. For example, some embodiments may provide a capability whereby user settings may be preserved even if the current instance of the operating system is removed prior to a reset being performed.

If it is determined in act 502 that sufficient storage space does exist for both instances of the operating system, and any other validation performed in act 502 was successful, then example process 500 proceeds to act 506, wherein the user is prompted to choose between "basic" and "advanced" reset operations. In some embodiments, performing an "advanced" reset includes presenting certain options relating to the reset to the user. The user may select from these options to specify the manner in which the reset is performed. One example option may, for example, be whether the current instance of the operating system is removed prior to a new instance being applied. Alternately, the new instance of the operating system may be applied before the current instance is removed. Any of numerous options may be presented.

The user's input selecting a basic or advanced reset operation is then processed in act 508. If the user opted for performing an advanced reset, then example process 500 proceeds to act 510, wherein the user is allowed to specify options relating to the reset operation. Act 512 then commences at the completion of act 510, or if it is determined in act 508 that the user opted for a basic reset operation, or upon the completion of act 504.

In act 512, the operating system is restarted in an offline environment. As noted above, an offline environment may be an execution environment in which an operating system is not executing. However, embodiments of the invention are not limited to such an implementation. Further, booting into an offline environment is but one possible technique for applying a new instance of the operating system to the storage element. Any of numerous other techniques may instead be employed.

Example process 500 then proceeds to act 514, wherein it is determined whether removal of the current instance of the operating system was approved (e.g., after presentation of a warning in act 504, or after the user opted for an advanced reset in act 506 and then indicated that the current instance should be removed in act 510). If so, process 500 proceeds to act 516, wherein the current instance of the operating system is removed in act 516. A recovery image is then applied in act 518, such as via the execution of programs in the offline boot environment.

Returning to act 514, if it is determined that removal of the current instance of the operating system was not approved (e.g., because the user opted for a basic reset in act 506, or opted for an advanced reset in act 506 but did not specify that the current instance should be removed in act 510), then process 500 proceeds to act 522, wherein a recovery image is applied, in addition to the current instance of the operating system already stored on the storage element. Example process 500 then proceeds to act 524, wherein data and settings are collected and stored, and the reset is then committed in act 526.

Upon the completion of either of acts 526 or 518, process 500 proceeds to act 520, wherein the applied recovery image is started. A determination is then made in act 528 whether the existing instance of the operating system was removed prior to applying the new instance. If so, example process 500 proceeds to act 530, wherein a "first-boot" experience is shown to the user. In this respect, because removal of the current instance of the operating system in example process 500 caused a "factory reset" to be performed, act 530 may include allowing the user to establish initial settings and/or perform other configuration tasks.

If it is determined in act 528 that the existing instance of the operating system was not removed prior to applying the new instance, then example process 500 proceeds to act 532, wherein data and/or settings (e.g., collected in act 524) are applied to the newly applied instance of the operating system. Example process 500 then proceeds to act 532, wherein the user is presented guidance on re-acquiring any applications that were removed as a consequence of performing the reset. This may be performed in any of numerous ways. For example, the user may be provided with access to an online facility which allows the user to re-install previously purchased programs.

Upon the completion of either of acts 530 or 534, example process 500 completes.

It should be appreciated from the foregoing that some embodiments of the invention may enable users to preserve their personal data and/or customized settings while a system reset is performed, so that the user need not endure the time-consuming process of performing a backup, to an external storage device which some users may need to purchase separately. Benefits may accrue to suppliers of computers and/or operating systems as well, since the suppliers may experience a reduction in user support interactions involving a reset being performed, since simplifying the reset operation may result in more users being confident enough to perform the operation on their own. Further, preserving the user's data and/or settings during a system reset may reduce user support interactions that previously resulted from lost data and/or settings.

Figure 6:
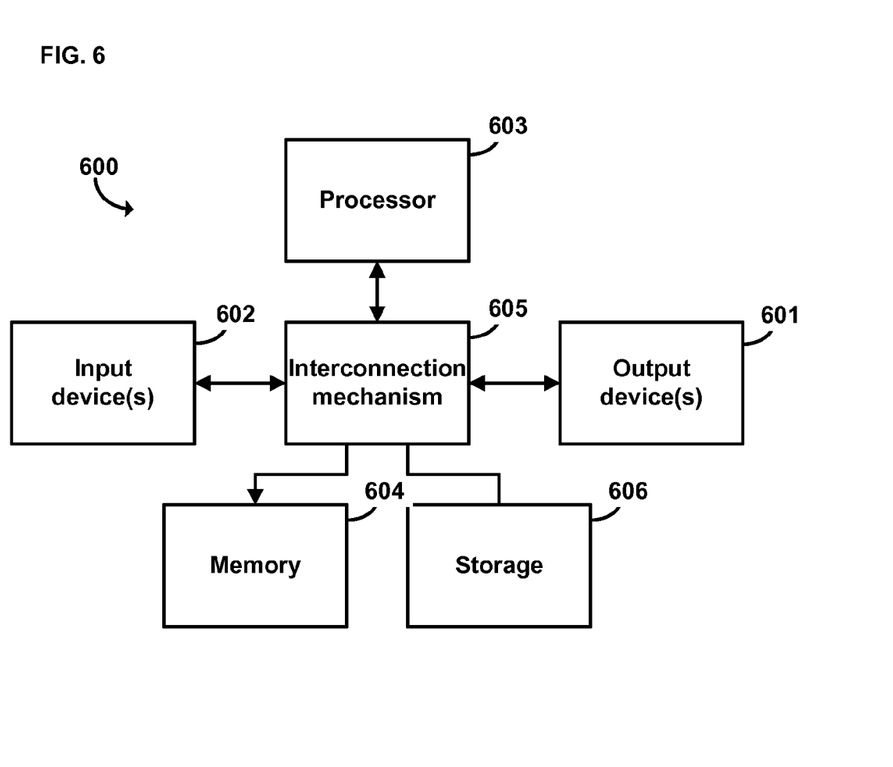
FIG. 6 is block diagram depicting an example computer which may be employed to implement some embodiments of the invention.

Various aspects of the systems and methods for practicing features of the present invention may be implemented on one or more computer systems, such as the exemplary computer system 600 shown in FIG. 6. Computer system 600 includes input device(s) 602, output device(s) 601, processor 603, memory system 604 and storage 606, all of which are coupled, directly or indirectly, via interconnection mechanism 605, which may comprise one or more buses, switches, networks and/or any other suitable interconnection. The input device(s) 602 receive(s) input from a user or machine (e.g., a human operator), and the output device(s) 601 display(s) or transmit(s) information to a user or machine (e.g., a liquid crystal display). The input and output device(s) can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

The processor 603 typically executes a computer program called an operating system (e.g., a Microsoft Windows-family operating system, or any other suitable operating system) which controls the execution of other computer programs, and provides scheduling, input/output and other device control, accounting, compilation, storage assignment, data management, memory management, communication and dataflow control. Collectively, the processor and operating system define the computer platform for which application programs and other computer program languages are written.

Processor 603 may also execute one or more computer programs to implement various functions. These computer programs may be written in any type of computer program language, including a procedural programming language, object-oriented programming language, macro language, or combination thereof These computer programs may be stored in storage system 606. Storage system 606 may hold information on a volatile or non-volatile medium, and may be fixed or removable. Storage system 606 is shown in greater detail in FIG. 7.

Figure 7:
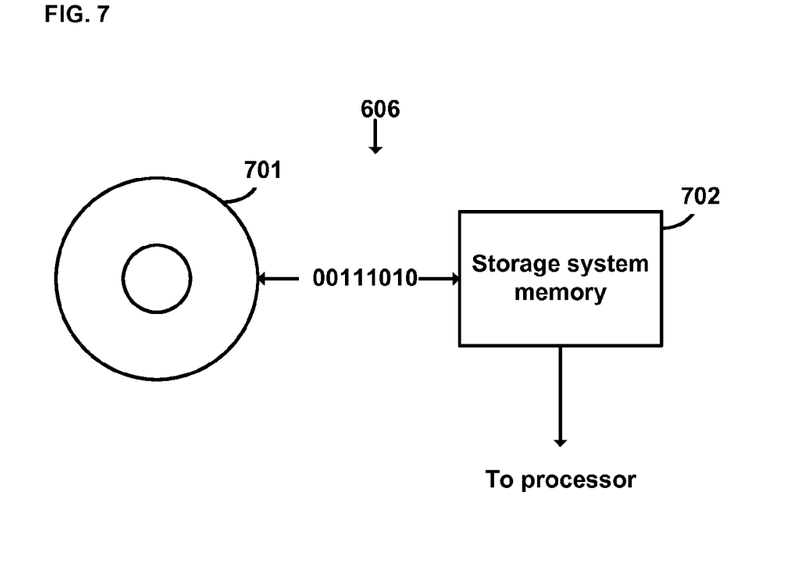
FIG. 7 is a block diagram depicting an example memory on which instructions embodying aspects of the invention may be recorded.

Storage system 606 may include a tangible computer-readable and writable non-volatile recording medium 501, on which signals are stored that define a computer program or information to be used by the program. The recording medium may, for example, be disk memory, flash memory, and/or any other article(s) of manufacture usable to record and store information. Typically, in operation, the processor 603 causes data to be read from the nonvolatile recording medium 601 into a volatile memory 502 (e.g., a random access memory, or RAM) that allows for faster access to the information by the processor 603 than does the medium 501. The memory 502 may be located in the storage system 606 or in memory system 604, shown in FIG. 6. The processor 603 generally manipulates the data within the integrated circuit memory 604, 502 and then copies the data to the medium 501 after processing is completed. A variety of mechanisms are known for managing data movement between the medium 501 and the integrated circuit memory element 604, 502, and the invention is not limited to any mechanism, whether now known or later developed. The invention is also not limited to a particular memory system 604 or storage system 606.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers and/or systems. Such processors may be implemented as integrated circuits, with one or more processors in an integrated circuit component, though a processor may be implemented using circuitry in any suitable format.

It should be appreciated that any component or collection of components that perform the functions described herein can be generically considered as one or more controllers that control the above-discussed functions. The one or more controllers can be implemented in numerous ways, such as with dedicated hardware, or by employing one or more processors that are programmed using microcode or software to perform the functions recited above. Where a controller stores or provides data for system operation, such data may be stored in a central repository, in a plurality of repositories, or a combination thereof It should also be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound-generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual environment.

In this respect, the invention may be embodied as a computer-readable medium (or multiple computer-readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage medium) encoded with one or more programs that, when executed on one or more computers or other processors, perform methods that implement the various embodiments of the invention discussed above. The computer-readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in the illustrative embodiments described herein.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

We claim as our invention:

1. A method for use in a computer system, the computer system comprising at least one storage element that stores at least a first instance of an operating system, a plurality of applications, and user data, the method comprising:
   removing the first instance of the operating system and at least some of the plurality of applications from the at least one storage element without removing the user data from the at least one storage element, including:
      removing the at least some of the plurality of applications based on a location at which the at least some of the plurality of application are installed; and
   installing a second instance of the operating system on the at least one storage element as a replacement for the removed first instance of the operating system without removing the user data from the at least one storage element.

2. The method of claim 1, wherein:
   the first instance of the operating system includes a plurality of settings; and
   installing the second instance of the operating system comprises:
      modifying one or more of the plurality of settings from the first instance of the operating system; and
      applying at least a portion of the plurality of settings from the first instance of the operating system to the second instance of the operating system.

3. The method of claim 1, wherein:
   the first instance of the operating system is configured with a user account having user data associated therewith; and
   installing the second instance of the operating system comprises migrating the user account and the user data associated therewith to the second instance of the operating system.

4. The method of claim 1, wherein:
   installing the second instance of the operating system comprises installing the second instance of the operating system from a recovery image on an external storage medium or on a recovery partition of the at least one storage element.

5. The method of claim 4, further comprising:
   booting the first instance of the operating system into an offline environment; and
   creating the recovery image in the offline environment, wherein installing the second instance of the operating system comprises installing the second instance of the operating system from the recovery image.

6. The method of claim 1, wherein the second instance of the operating system is installed prior to the completion of the removal of the first instance of the operating system.

7. The method of claim 1, further comprising:
   facilitating reinstallation, from an online repository, of at least one removed application of the plurality of applications.

8. The method of claim 1, wherein removing the first instance of the operating system and the at least some of the plurality of applications includes retaining at least one other application, the at least one other application being designated for retention.

9. A computer-readable storage medium having instructions recorded thereon which, in response to execution by a processor, enable operations for use in a computer system comprising at least one storage element storing a first instance of an operating system, a plurality of applications, and data created by a user of the computer system, the operations comprising:
   determining whether the at least one storage element has sufficient storage space to store both the first instance of the operating system and a second instance of the operating system;
   in response to a determination that the at least one storage element does not have sufficient storage space to store both the first instance of the operating system and the second instance of the operating system:
      removing the first instance of the operating system and the plurality of applications from the at least one storage element without removing the data created by the user from the at least one storage element; then
      installing the second instance of the operating system on the at least one storage element as a replacement of the first instance of the operating system without removing the data created by the user from the at least one storage element; and
   in response to a determination that the at least one storage element has sufficient storage space to store both the first instance of the operating system and the second instance of the operating system:
      installing the second instance of the operating system on the at least one storage element without removing the data created by the user from the at least one storage element; then
      removing the first instance of the operating system and the plurality of applications from the at least one storage element without removing the data created by the user from the at least one storage element.

10. The computer-readable storage medium of claim 9, wherein:
   the first instance of the operating system includes a plurality of settings; and
   installing the second instance of the operating system comprises:
      modifying one or more of the plurality of settings from the first instance of the operating system as prevention of a known or otherwise anticipated problem; and applying at least a portion of the plurality of settings from the first instance of the operating system to the second instance of the operating system.

11. The computer-readable storage medium of claim 9, further comprising:

booting the first instance of the operating system into an offline environment; and creating a recovery image in the offline environment, wherein installing the second instance of the operating system comprises installing the second instance of the operating system from the recovery image.

12. The computer-readable storage medium of claim 9, wherein removing the first instance of the operating system and the plurality of applications includes removing the plurality of applications based on a location at which the plurality of application are installed.

13. The computer-readable storage medium of claim 9, wherein removing the first instance of the operating system and the plurality of applications includes retaining at least one other application, the at least one other application being designated for retention.

14. A computer system, comprising:

at least one storage element storing a first instance of an operating system, a plurality of applications, and user created data; and a memory and at least one processor that are respectively configured to store and execute instructions, including instructions to perform operations, the operations including:

removal of the first instance of the operating system and the plurality of applications from the at least one storage element without removal of the user created data from the at least one storage element; and installation of a second instance of the operating system on the at least one storage element to replace the first instance of the operating system without removal of the user created data from the at least one storage element, including:

selective initiation of the installation before completion of the removal based on an availability of storage space on the at least one storage element.

15. The computer system of claim 14, wherein the first instance of the operating system is associated with one or more user accounts, and wherein the installation of the second instance of the operating system also include migration of at least a portion of at least one of the one or more user accounts to be associated with the second instance of the operating system.

16. The computer system of claim 14, wherein the operations further include:

movement of the user created data to a protected area of the at least one storage element.

17. The computer system of claim 14, wherein the removal of the first instance of the operating system and the plurality of applications includes removal of the plurality of applications based on a location at which the plurality of application are installed.

18. The computer system of claim 14, wherein the removal of the first instance of the operating system and the plurality of applications includes retention of at least one other application, the at least one other application being designated for retention.

19. The computer system of claim 14, wherein the operations further include:

determination of whether the at least one storage element has sufficient storage space to store both the first instance of the operating system and the second instance of the operating system.

20. The computer system of claim 19, wherein the installation is initiated before the completion of the removal if the at least one storage element has sufficient storage space to store both the first instance of the operating system and the second instance of the operating system.

* * * * *